(12) United States Patent
Fujita et al.

(10) Patent No.: US 10,956,085 B2
(45) Date of Patent: Mar. 23, 2021

(54) MEMORY SYSTEM AND PROCESSOR SYSTEM

(71) Applicant: TOSHIBA MEMORY CORPORATION, Tokyo (JP)

(72) Inventors: Shinobu Fujita, Tokyo (JP); Susumu Takeda, Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 154 days.

(21) Appl. No.: 16/234,438

(22) Filed: Dec. 27, 2018

(65) Prior Publication Data

US 2019/0212947 A1 Jul. 11, 2019

(30) Foreign Application Priority Data

Jan. 5, 2018 (JP) .............................. JP2018-000782

(51) Int. Cl.
*G06F 3/06* (2006.01)
*G06F 12/08* (2016.01)
*G06F 11/14* (2006.01)

(52) U.S. Cl.
CPC .......... *G06F 3/0659* (2013.01); *G06F 3/0604* (2013.01); *G06F 3/068* (2013.01); *G06F 11/14* (2013.01); *G06F 12/08* (2013.01)

(58) Field of Classification Search
CPC .......... G06F 3/0659; G06F 3/068; G06F 3/06; G06F 3/0604; G06F 12/0868; G06F 12/0897; G06F 11/1456; G06F 11/14; G06F 12/08; G06F 2212/225; G06F 2212/313; G06F 2201/84; G06F 2212/283; G06F 2212/466; G06F 11/1446; G06F 2212/311; G06F 2212/1032; Y02D 10/00
USPC .................................................. 711/103, 154
See application file for complete search history.

(56) References Cited

U.S. PATENT DOCUMENTS

| | | | |
|---|---|---|---|
| 8,019,929 B2 | 9/2011 | Kimura | |
| 9,146,803 B2* | 9/2015 | Ogawa | ................ G06F 11/0727 |
| 9,798,475 B2* | 10/2017 | Kamimura | ............ G06F 3/0619 |
| 9,852,060 B2 | 12/2017 | Berke et al. | |

(Continued)

FOREIGN PATENT DOCUMENTS

| | | |
|---|---|---|
| JP | 2016-062505 A | 4/2016 |
| JP | 2017-073129 A | 4/2017 |

(Continued)

OTHER PUBLICATIONS

"Method to mitigate data loss in a multiple failure scenario", IP.com Prior Art Database Technical Disclosure, Feb. 22, 2005.*

*Primary Examiner* — Pierre Miche Bataille
(74) *Attorney, Agent, or Firm* — Foley & Lardner LLP

(57) ABSTRACT

A memory system connected to a processor is described. The memory system includes a volatile first storage section, a nonvolatile second storage section having a smaller storage capacity than that of the first storage section, and a storage control section that performs control to store data sets in the second storage section. Each of the data sets including data written in the first storage section in response to a write command from the processor, address information indicating a write destination in the first storage section, and address information indicating a write destination in a nonvolatile third storage section to which the data written in the first storage section is to be written back.

18 Claims, 7 Drawing Sheets

(56) References Cited

U.S. PATENT DOCUMENTS

| | | | |
|---|---|---|---|
| 10,031,674 B2 | 7/2018 | Hanson et al. | |
| 10,248,322 B2* | 4/2019 | Kanno | G06F 3/061 |
| 2008/0028132 A1* | 1/2008 | Matsuura | G11C 16/10 |
| | | | 711/103 |
| 2013/0297880 A1* | 11/2013 | Flynn | G06F 11/108 |
| | | | 711/128 |
| 2015/0100721 A1* | 4/2015 | Koseki | G06F 11/108 |
| | | | 711/103 |
| 2016/0026524 A1* | 1/2016 | Hoya | G11C 7/12 |
| | | | 714/764 |
| 2016/0275017 A1 | 9/2016 | Takeda | |
| 2017/0004095 A1 | 1/2017 | Takeda et al. | |
| 2017/0143032 A1* | 5/2017 | Eitzinger | D21H 17/29 |
| 2017/0199817 A1* | 7/2017 | Ishihara | G06F 12/0804 |
| 2018/0059980 A1 | 3/2018 | Takeda et al. | |
| 2018/0081555 A1 | 3/2018 | Noguchi et al. | |
| 2018/0307433 A1* | 10/2018 | Takaoka | G06F 3/0644 |
| 2019/0034328 A1* | 1/2019 | Sato | H04L 1/08 |

FOREIGN PATENT DOCUMENTS

| | | |
|---|---|---|
| JP | 2018-032256 A | 3/2018 |
| JP | 2018-049381 A | 3/2018 |

* cited by examiner

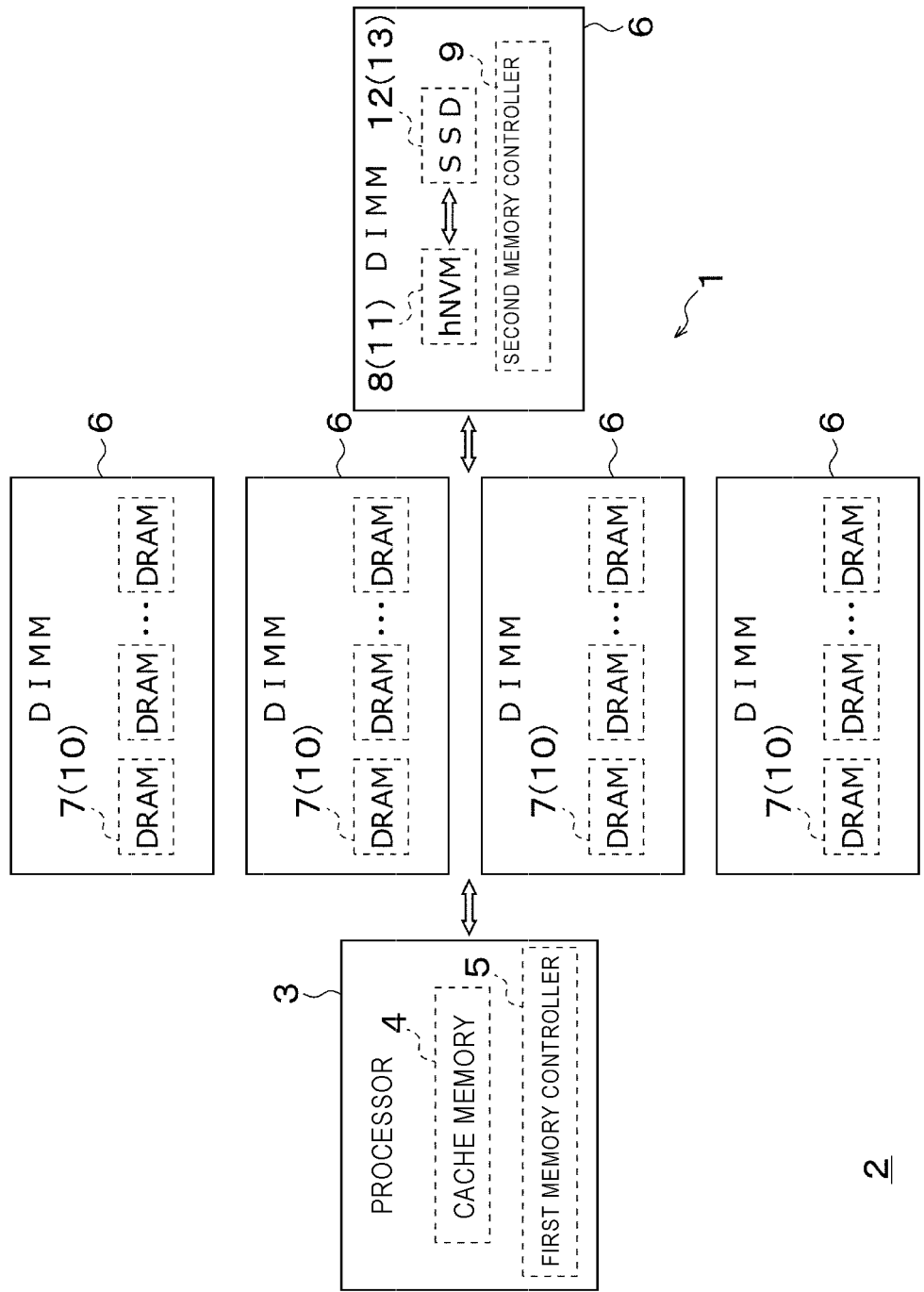

US 10,956,085 B2

MEMORY SYSTEM AND PROCESSOR SYSTEM

This application is based upon and claims the benefit of priority from Japanese Patent Application No. 2018-000782, filed Jan. 5, 2018, the entire contents of which are incorporated herein by reference.

FIELD

Embodiments relate to a memory system and a processor system.

BACKGROUND

A highly reliable main memory that safely holds data in a main memory even when unexpected power loss occurs is generally called a persistent memory. An NVDIMM (Non-Volatile Dual Inline Memory Module) is formulated as standard related to this type of memory.

The NVDIMM includes a DRAM (Dynamic Random Access Memory) used as a main memory, a backup power supply for DRAM, a NAND flash memory, and a memory controller for NVDIMM. When the power supply of the NVDIMM is lost, data in the DRAM is saved in the NAND flash memory by using the backup power supply. The backup power supply is configured with a battery, a super capacitor and the like. The mounting area of the backup power supply hinders miniaturization of the system, and the cost of parts is increased by providing the backup power supply.

If a high-speed nonvolatile memory such as a MRAM (Magnetoresistive RAM) is used as the main memory instead of a DRAM, a backup power supply is unnecessary, but in a high-speed nonvolatile memory, the miniturization of a memory cell is difficult, and a bit unit price is higher than that of a DRAM, thus, it is not suitable for general applications.

DESCRIPTION OF THE DRAWINGS

FIG. 8 is a block diagram showing a schematic configuration of a processor including a memory system according to a fourth embodiment.

DETAILED DESCRIPTION

Embodiments provide a memory system and a processor system capable of writing back data not yet written back from a main memory with excellent reliability even when unexpected power loss occurs.

In general, according to one embodiment, a memory system includes: a volatile first storage section; a nonvolatile second storage section having a smaller storage capacity than that of the first storage section; and a storage control section (storage controller) that performs control to store data sets in the second storage section, each of the data sets including data to be written or already written in the first storage section in response to a write command from a processor, address information indicating a write destination in the first storage section, and address information indicating a write destination in a nonvolatile third storage section to which the data written in the first storage section is to be written back.

An embodiment of the present disclosure will now be described with reference to the accompanying drawings. In the following embodiments, the characteristic configurations and operations in a memory system 1 and a processor system 2 will be mainly described. It should be noted that there may be configurations and operations in the memory system 1 and the processor system 2, which are omitted in the following description. Characteristic configurations and operations of the memory system 1 and the processor system 2 will be mainly described below.

First Embodiment

Figure 1:
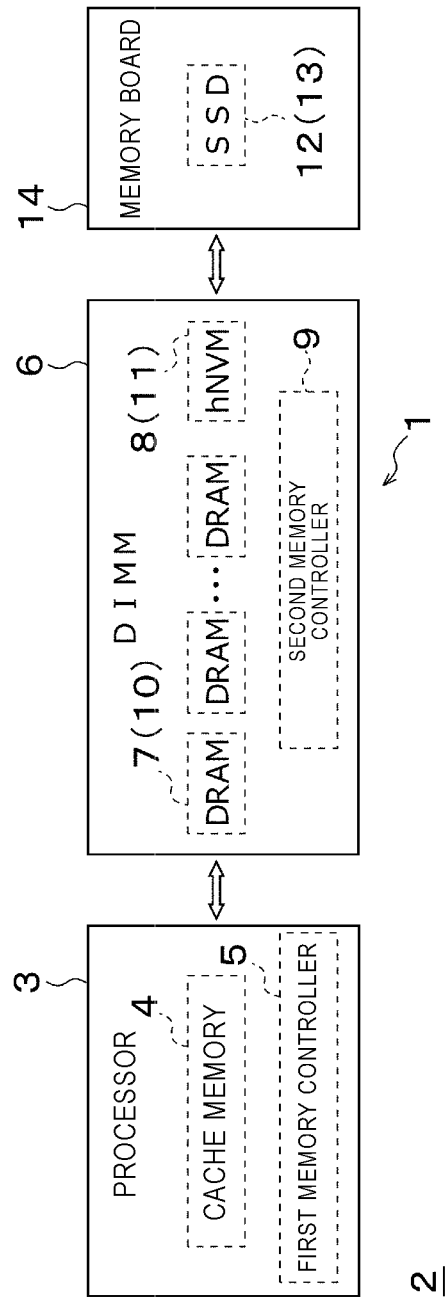
FIG. 1 is a block diagram showing a schematic configuration of a processor system including a memory system according to a first embodiment.

FIG. 1 is a block diagram showing a schematic configuration of a processor system 2 including a memory system 1 according to a first embodiment. The processor system 2 of FIG. 1 includes a processor 3 and a memory system 1. A cache memory 4 and a first memory controller 5 are provided inside the processor 3. It is noted that the cache memory 4 may be hierarchized in two or more stages. In addition, the first memory controller 5 may be provided separately from the processor 3. The first memory controller 5 controls the access of the processor to the memory system 1. Here, the access is writing/reading of data to/from the memory system 1.

The memory system 1 may have a DIMM 6 fitted in a DIMM socket standardized by JEDEC (Joint Electron Device Engineering Council), for example, or may have a memory board (member) other than the DIMM 6. Further, only one memory board such as the DIMM 6 may be provided, or a plurality of memory boards may be provided. Hereinafter, an example in which the memory system 1 includes the DIMM 6 will be described.

First storage sections 7, a second storage section 8, and a second memory controller (storage control section or storage controller) 9 are mounted on the DIMM 6. Each of the first storage sections 7 is a volatile memory such as a DRAM 10. In FIG. 1, an example in which the DRAM 10 is used as the first storage section 7 is shown. The processor 3 accesses the first storage section 7 as a main memory. When the processor 3 accesses the first storage section 7, an access location is designated by a physical address.

The second storage section 8 may be a high-speed nonvolatile memory (hNVM) 11 such as an MRAM. It is desirable that the second storage section 8 can write at least at the speed equal to or higher than that of the DRAM 10. More desirably, the second storage section 8 has a write latency of 100 ns or less. Since the second storage section 8 need only have a write latency of 100 ns or less, the second storage section 8 does not necessarily have to be configured with an MRAM, and may be configured with another nonvolatile memory. The second storage section 8 has a smaller storage capacity than that of the first storage section 7. The second storage section 8 has higher cost per unit bit than that of the first storage section 7. However, in the embodiment, by significantly reducing the storage capacity of the second storage section 8 compared with the first storage section 7, an excessive rise in part cost is prevented, and the need for a backup power supply is eliminated. Thus, reduction in total cost can be realized.

The second memory controller 9 stores data sets in the second storage section 8, each of the data sets including data to be written or already written in the first storage section 7 in response to a write command from the processor 3, address information indicating a write destination in the first storage section 7, and address information indicating a write destination in a nonvolatile third storage section 12 to which the data written in the first storage section 7 is to be written back.

The third storage section 12 is a nonvolatile memory such as an SSD (Solid State Disk) 13 provided separately from the first storage section 7 and the second storage section 8, or a nonvolatile storage device such as an HDD (Hard Disk Drive) In FIG. 1, an example in which the SSD 13 is used as the third storage section 12 is shown. In at least one embodiment, it is assumed that the storage capacity of the third storage section 12 is larger than the storage capacity of the first storage section 7 and the second storage section 8. As an example, the storage capacity of the first storage section 7 is 16 GB, that of the second storage section 8 is 1 GB, and that of the third storage section 12 is 1 TB. In FIG. 1, an example in which the third storage section 12 configured with the SSD 13 is mounted on a memory board 14 is shown. The memory board 14 may be a DIMM 6, a memory board having a standard interface such as PCIe (Peripheral Component Interconnect express), or a memory board having a unique interface that is not standard, for example.

Figures 2, 3:
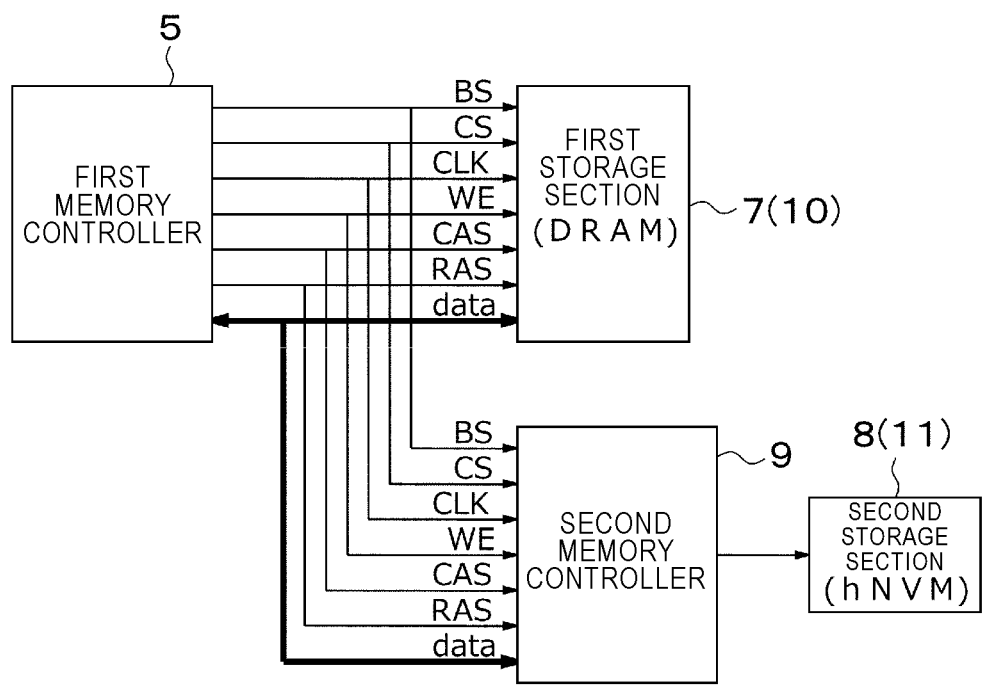
FIG. 2 is a diagram explaining an operation of a second memory controller.
FIG. 3 is a diagram showing a data configuration in a second storage section.

FIG. 2 is a diagram explaining an operation of the second memory controller 9. As shown in FIG. 2, the first memory controller 5 outputs data, an address signal, a clock signal, and various control signals to the first storage section 7 (for example, the DRAM 10). There are two kinds of address signals: CAS and RAS. The control signal includes a bank select BS, a chip select CS, a write enable WE. These signals are output from the interface section of the first memory controller 5 to the interface section of the first storage section 7 through an external bus. These signals are then branched from the external bus and taken in the second memory controller 9. On the basis of each signal taken in, the second memory controller 9 stores data sets in the second storage section 8, each of the data sets including data to be written or already written in the first storage section 7, address information indicating a write destination in the first storage section 7, and address information indicating a write destination in the third storage section 12 to which the data written in the first storage section 7 is to be written back. The address information indicating the write destination in the third storage section 12 can be detected by querying an OS (Operating System), for example. Further, the second memory controller 9 may store in the second storage section 8, other attribute information included in the data set. The attribute information may be, for example, information indicating whether the data is valid or invalid, information indicating whether the data is already written back to the SSD or the HDD, or the like. It is noted that whether to store the attribute information in the second storage section 8 can be selected as an option. The second storage section 8 may have a unique address different from that of the first storage section 7 so as to control the physical location of writing, or simply write sequentially in chronological order without any unique address. Using the information of the data set, the second memory controller 9 can write the data back to the third storage section 12 at the time of power supply restoration. In addition, during normal power supply, the OS automatically writes the data back to the third storage section 12 sequentially. The second memory controller 9 can also pick up the information from the OS and write in the attribute of the corresponding data set that each of the data write-back is completed. The data is erasable data at any time.

FIG. 3 is a diagram showing a data configuration in the second storage section 8. As shown, the second storage section 8 stores data sets, each including the write address in the first storage section 7 (main memory), the write address in the third storage section 12 (SSD 13), the written data and the attribute.

Figure 4:
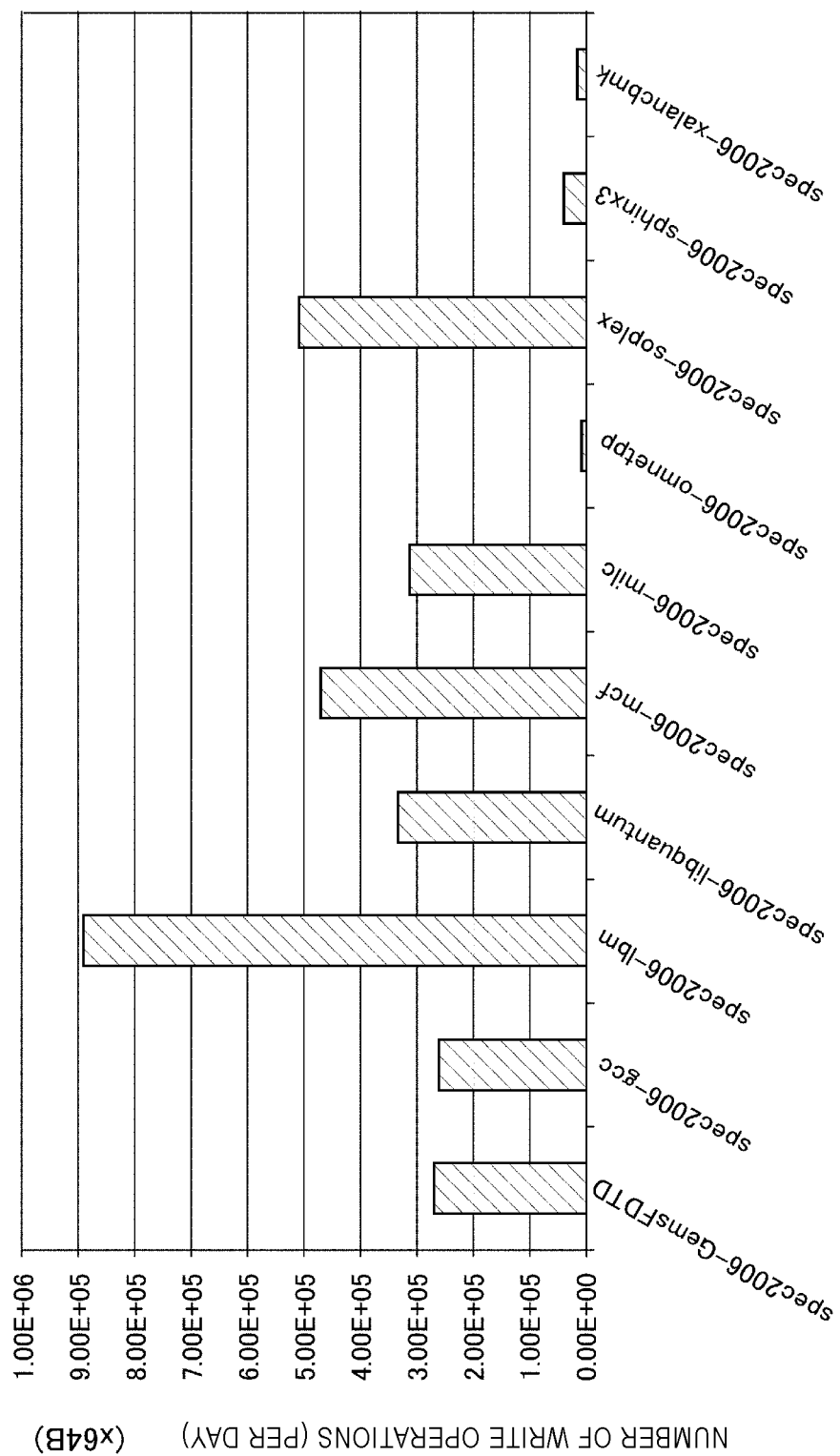
FIG. 4 is a graph showing the total amount of data written back by a main memory to a third storage section per day.

FIG. 4 represents a simulation result using a part of a processor benchmark software group called Spec 2006, and illustrates a graph showing the number of writing operations to a general main memory when each software is continuously operated all day, that is, the total amount of data written back by a main memory to the third storage section 12 per day. In FIG. 4, the horizontal axis represents the type of application software and the vertical axis represents the total amount of data written back per day. The calculation result in FIG. 4 shows the simulation result when the processor 3 is operated at an operation speed of 3.2 GHz, the cache is configured with a 32 kB primary cache and 1 MB secondary cache, and the main memory capacity is 16 GB.

As can be seen from FIG. 4, the total amount of data written back to the main memory greatly differs depending on application software, but even for application software with the largest total data amount, the total amount is less than 1 GB.

The second storage section 8 according to at least one embodiment stores data sets relating to the updated data, out of the data in the first storage section 7. Therefore, from the result of FIG. 4, when the storage capacity of the first storage section 7 is 16 GB, and when backing up to the SSD or the HDD is performed once a day, the storage capacity of the second storage section 8 of 1 GB is sufficient. The total data amount on the vertical axis in FIG. 4 is considered to change in proportion to the storage capacity of the main memory. Therefore, when the storage capacity of the first storage section 7 is 32 GB, the storage capacity of the second storage section 8 is required to be about 2 GB. Such capacities are prepared, and all the data sets are written in the second storage section 8. Then, new data sets may be overwritten sequentially on old data sets.

Figure 5:
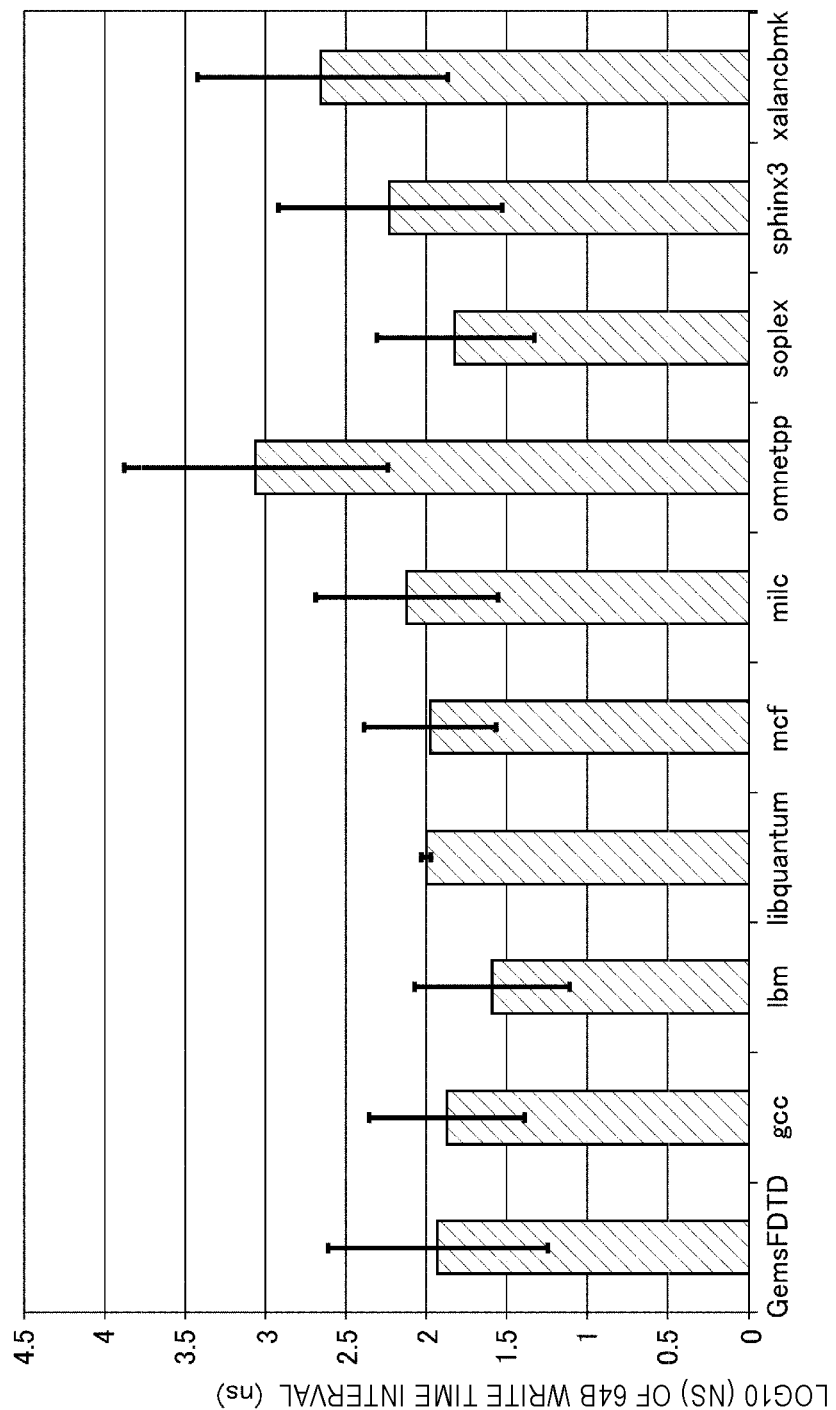
FIG. 5 is a graph showing write-back frequency to the main memory.

FIG. 5 is a graph showing write-back frequency to the main memory. FIG. 5 shows the simulation calculation result of write-back frequency for each of a plurality of types of typical application software. Writing back to the main memory is performed in units of 64 bytes, and the write-back frequency of 64 bytes is 200 to 300 ns on average (that is, about 2 to 3 GB/s), or in the fast one, 20 to 30 ns intervals. Therefore, for the second storage section 8, a nonvolatile memory capable of high-speed writing at several tens of nanoseconds is required. When a nonvolatile memory that cannot perform high-speed writing at several tens of nanoseconds is used for the second storage section 8, it takes a long time to write in the second storage section 8, data sets relating to the data for which the processor 3 issued a write command to the first storage section 7. Thus, the processor 3 has to wait until the writing to the second storage section 8 is completed, and the processing performance of the processor 3 deteriorates. Currently, there is only STT (Spin Transfer Torque)—MRAM as a nonvolatile memory capable of high-speed writing in several tens of nanoseconds. By providing a high-speed buffer in the interface portion of the second memory controller 9, the request for the writing speed to the second storage section 8 is alleviated to some extent. However, when maintenance of the processing performance of the processor 3 is required, the desirable write latency is 100 ns or less.

Next, the operation of the memory system 1 of FIG. 1 will be described. The processor 3 writes and reads data using the first storage section 7 as a main memory. More specifically, when the processor 3 makes an access request to the main memory, in response to the access request from the processor 3, the first memory controller 5 sends data, an address signal, a clock signal and various control signals to the first storage section 7 to write and read data to and from the first storage section 7.

The data, address signal, clock signal and various control signals sent by the first memory controller 5 to the first storage section 7 are also sent to the second memory controller 9. On the basis of these signals, the second memory controller 9 monitors whether the processor 3 issued a write command to the first storage section 7 which serves as the main memory, and, when the processor 3 issued a write command, the second memory controller 9 stores data sets in the second storage section 8, each of the data sets including data to be written or already written in the first storage section 7, address information indicating a write destination in the first storage section 7, and address information indicating a write destination in the third storage section 12 to which the data written in the first storage section 7 is to be written back.

Here, even when the data in the first storage section 7 is erased due to unintentional power loss such as a power failure, data sets relating to the latest data in the first storage section 7 are stored in the second storage section 8. Therefore, after the power supply is restored thereafter, the second memory controller 9 performs control to write back the data that should originally be written back to the third storage section 12, based on the data sets in the second storage section 8. As a result, even when the data in the first storage section 7 is unintentionally erased, all necessary data can be written in the third storage section 12.

In FIG. 1, when a plurality of DIMMs 6 are provided, two or more DIMMs 6 may share a third storage section 12, or a third storage section 12 may be provided in each DIMM 6. Further, separately from the third storage section 12, an HDD or the like having a larger capacity than that of the third storage section 12 may be provided and the data may be saved in the HDD before the third storage section 12 becomes full.

In FIG. 1, an example in which the first memory controller 5 is provided inside the processor 3 and the second memory controller 9 is provided in the memory board such as the DIMM 6 or the like is shown. Alternatively, the second memory controller 9 may be provided inside the processor 3, or it may be provided in another memory board on which the third storage section 12 is mounted.

In this way, in the first embodiment, the nonvolatile second storage section 8 having a smaller storage capacity than that of the volatile first storage section 7 is provided, and when the processor 3 issues a write command to the first storage section 7, data sets each including data to be written or already written in the first storage section 7, address information indicating a write destination in the first storage section 7, and address information indicating a write destination in the third storage section 12 to which the data written in the first storage section 7 is to be written back are stored in the second storage section 8. As a result, even when the data in the first storage section 7 is erased due to unintentional power loss or the like, since the second storage section 8 holds data sets relating to data to be written back to the third storage section 12, after restoration of the power supply, necessary data can be written back from the second storage section 8 to the third storage section 12.

According to at least one embodiment, even if the storage capacity of the second storage section 8, which is a high-speed nonvolatile memory having a higher price than that of the first storage section 7, is small, all of the data sets relating to the data for which the processor 3 issued a write command to the first storage section 7 can be stored in the second storage section 8. Further, in the embodiment, since the backup power supply for unintentional power loss of the memory system 1 is unnecessary, it is possible to take countermeasures for unintentional data erasure in the first storage section 7 without costing much and without requiring a large space such as a backup power supply.

Second Embodiment

Figure 6:
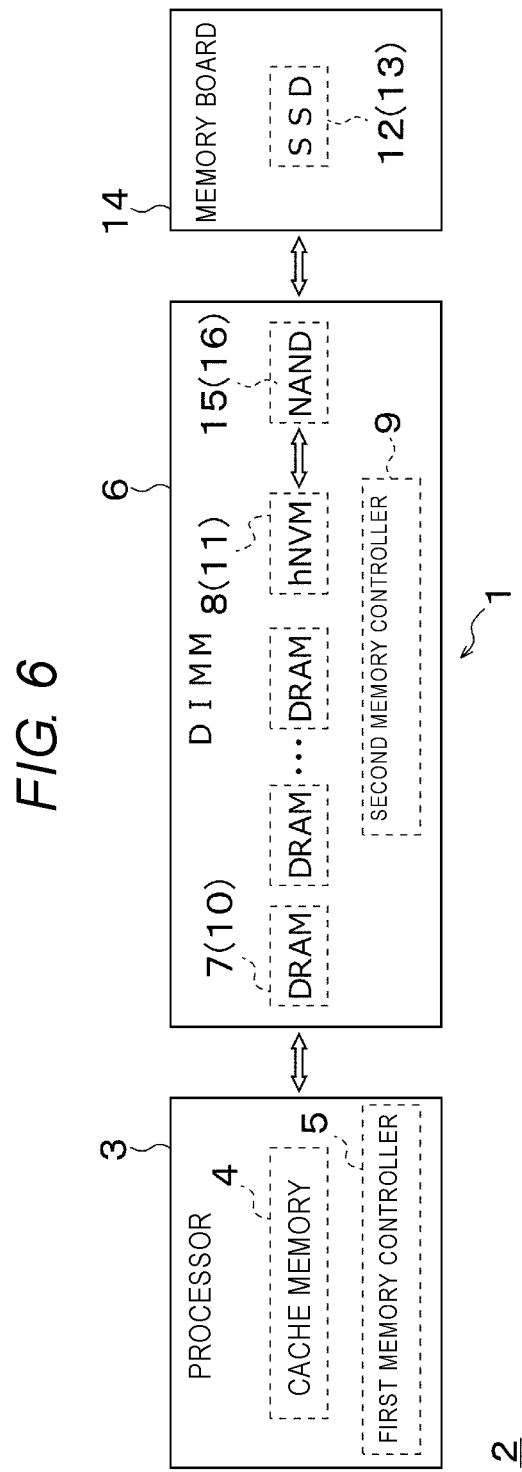
FIG. 6 is a block diagram showing a schematic configuration of a processor including a memory system according to a second embodiment.

FIG. 6 is a block diagram showing a schematic configuration of the processor 3 including the memory system 1 according to a second embodiment. The memory system 1 in FIG. 6 includes a memory board such as the DIMM 6. A plurality of memory boards may be provided. In FIG. 6, an example in which a DIMM 6 is provided as a memory board is shown.

In addition to the first storage section 7, the second storage section 8, and the second memory controller 9, a nonvolatile fourth storage section 15 is also mounted on the DIMM 6. The fourth storage section 15 is, for example, a NAND flash memory 16. The fourth storage section 15 is assumed to have a storage capacity larger than that of the second storage section 8 and smaller than that of the third storage section 12. It is noted that the second memory controller 9 in FIG. 6 may be provided in the processor 3.

In the memory system 1 of FIG. 6, when the processor 3 issues a write command to the first storage section 7 which serves as the main memory, the second memory controller 9 stores data sets in the second storage section 8, each of the data sets including data to be written or already written in the first storage section 7, address information indicating a write destination in the first storage section 7, and address information indicating a write destination in the third storage section 12 to which the data written in the first storage section 7 is to be written back. Although the second embodiment is the same as in the first embodiment up to this point, even while power is being supplied to the first storage section 7, the second memory system 1 according to the second embodiment performs a process of copying the data sets in the second storage section 8 to the fourth storage section 15 in an interval between the processes of the processor 3, that is, during a period from the execution of the write command to the execution of the next write command by the processor 3. Since it is not necessary that the data sets copied to the fourth storage section 15 are kept being held in the second storage section 8, if the processor 3 issues a write command to the first storage section 7 thereafter, data sets relating to new data to be written back are overwritten in the second storage section 8. As described above, the data sets in the second storage section 8 are copied to the fourth storage section 15, and then overwritten by data newly written to the first storage section 7 by the processor 3. As a result, the storage capacity of the second storage section 8 can be significantly reduced as compared with the first embodiment.

Since the fourth storage section 15 is mounted on the same DIMM 6 as the first storage section 7 and the second storage section 8, the data sets in the second storage section 8 can be copied at high speed. It is to be noted that writing data to the fourth storage section 15 is performed in the background processing in an interval between the processes of the processor 3, that is, during a period from the execution of the write command to the execution of the next write command by the processor 3, therefore, the writing speed of the fourth storage section 15 need not be as high as that of the second storage section 8. Thus, the general-purpose NAND flash memory 16 is sufficient.

After the data in the first storage section 7 is lost due to power loss, when the power supply is restored again, the second memory controller 9 writes the data back to the third storage section 12 based on the data sets in the fourth storage section 15.

As described above, in the second embodiment, while power is being supplied to the first storage section 7, an interval between the processes of the processor 3, that is, a period from the execution of the write command to the execution of the next write command by the processor 3 is used to frequently perform a process of copying the data sets in the second storage section 8 to the fourth storage section 15, therefore, the storage capacity of the second storage section 8 formed of an expensive high-speed nonvolatile memory can be reduced as compared with the first embodiment. Consequently, the second storage section 8 according to the embodiment requires a storage capacity of only 1/10 or less as compared with the second storage section 8 of the first embodiment. Therefore, according to the second embodiment, cost reduction can be achieved as compared with the first embodiment.

Third Embodiment

In the memory system 1 according to a third embodiment, a DIMM 6 on which a high-speed nonvolatile memory is mounted is provided separately from the DIMM 6 for the main memory.

Figure 7:
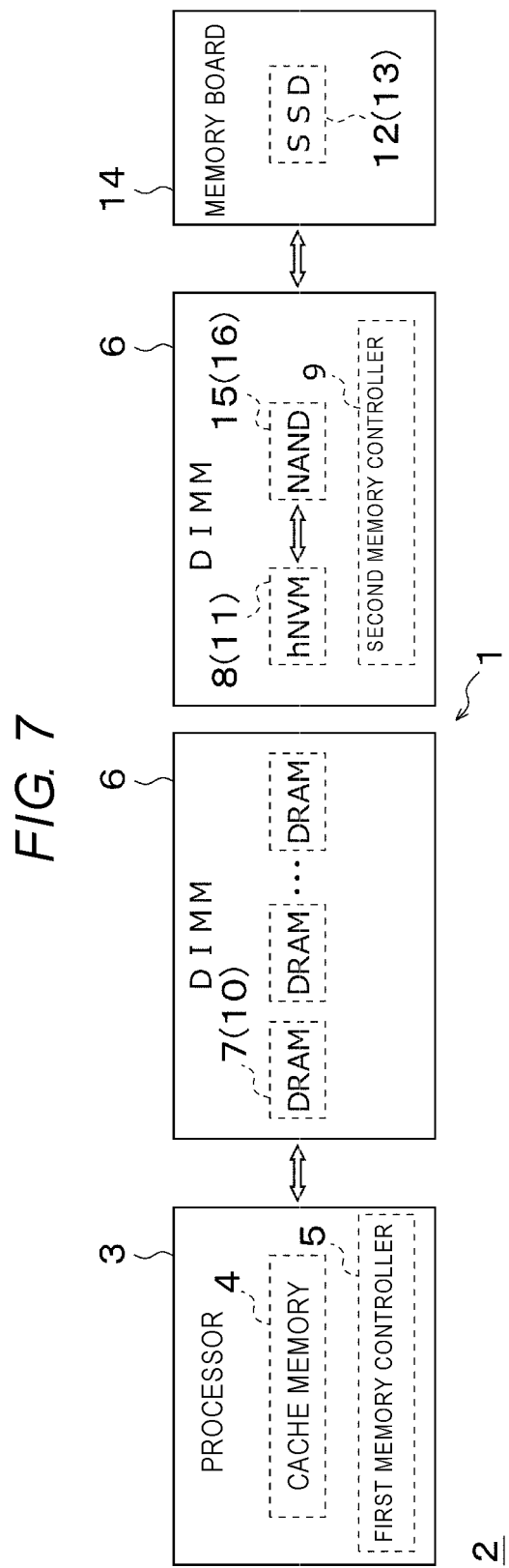
FIG. 7 is a block diagram showing a schematic configuration of a processor including a memory system according to a third embodiment.

FIG. 7 is a block diagram showing a schematic configuration of the processor 3 including the memory system 1 according to a third embodiment. The memory system 1 of FIG. 7 is different from the memory system 1 of FIG. 6 in that a DIMM 6 on which the second storage section 8 and the fourth storage section 15 are mounted is provided separately from the DIMM 6 on which the first storage section 7 such as the DRAM 10 is mounted. The storage capacity of the second storage section 8 in FIG. 7 is larger than the storage capacity of the second storage section 8 in FIG. 6. In the second embodiment, even while power is being supplied to the first storage section 7, an interval between the processes of the processor 3, that is, a period from the execution of the write command to the execution of the next write command by the processor 3 is used to copy the data sets in the second storage section 8 to the fourth storage section 15. On the other hand, in the third embodiment, only when the first storage section 7 loses the power supply, the data sets in the second storage section 8 are copied to the fourth storage section 15. Therefore, the second storage section 8 according to the third embodiment requires more storage capacity than that of the second storage section 8 according to the second embodiment. More specifically, the second storage section 8 according to the third embodiment requires as much storage capacity as that of the second storage section 8 according to the first embodiment. The second memory controller 9 writes the data back to the third storage section 12 based on the data sets copied to the fourth storage section 15 after the power supply is restored.

As described above, in the memory system 1 according to the third embodiment, the processor 3 writes to the second storage section 8, the data sets relating to the data for which the processor 3 issued the write command to the first storage section 7, and when the data in the first storage section 7 is lost due to power loss, the data sets in the second storage section 8 are copied to the fourth storage section 15. As a result, the second memory controller 9 can correctly write the data back to the third storage section 12 based on the data in the fourth storage section 15. It is noted that also in the third embodiment, the second memory controller 9 may be provided in the processor 3.

Fourth Embodiment

In a fourth embodiment, a memory board such as another DIMM 6 on which the second storage section 8 and the second memory controller 9 are mounted is provided in addition to providing the DIMM 6 similar to one according to the related art.

FIG. 8 is a block diagram showing a schematic configuration of the processor 3 including the memory system 1 according to the fourth embodiment. In addition to a plurality of DIMMs 6 (a plurality of first members) each of which is mounted with a first storage section 7, the memory system 1 of FIG. 8 includes a DIMM 6 (a second member) on which the second storage section 8 and the second memory controller 9 are mounted. In FIG. 8, an example in which four DIMMs 6 and one DIMM 6 are provided is shown. It should be noted that the number of DIMMs 6 is freely selected and depends on the particular application.

When the processor 3 issues a write command to a first storage section 7 on one of the plurality of DIMMs 6, the second memory controller 9 stores data sets in the second storage section 8, each of the data sets including data to be written or already written in the first storage section 7, address information indicating a write destination in the first storage section 7, and address information indicating a write destination in the third storage section 12 to which the data written in the first storage section 7 is to be written back.

In this manner, in the fourth embodiment, since the general-purpose DIMM 6 on which the first storage section 7 such as the DRAM 10 is mounted can be used as it is, and another DIMM 6 on which the second storage section 8 and the second memory controller 9 are mounted is provided, even if the data in the general-purpose DIMM 6 is lost due to power loss, the data sets relating to the data to be written can be stored in the second storage section 8 before the data is lost. Therefore, after the power supply restoration, the data to be written back can be written back to the third storage section 12.

Aspects of the present disclosure are not limited to the individual embodiments described above, and include various modifications that can be conceived by those skilled in the art, and the effects of the present disclosure are not limited to the contents described above. Namely, various additions, modifications and partial deletions are possible without departing from the conceptual idea and spirit of the present disclosure derived from the contents defined in the claims and their equivalents.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a processor, the memory system comprising:
   a volatile first storage section;
   a nonvolatile second storage section having a smaller storage capacity than that of the first storage section;
   a storage controller configured to control to store data sets in the second storage section, each of the data sets including data written in the first storage section in response to a write command from the processor, address information indicating a write destination in the first storage section, and address information indicating a write destination in a nonvolatile third storage section to which the data written in the first storage section is to be written back;
   a nonvolatile fourth storage section that stores at least some of the data sets stored in the second storage section,
   wherein when the data in the first storage section is lost before the data in the first storage section is written back to the third storage section, the storage controller is configured to write back the data sets stored in the second storage section to the fourth storage section.

2. The memory system according to claim 1, wherein when the data in the first storage section is lost before the data in the first storage section is written back to the third storage section, the storage controller is configured to write the data to be written back to the third storage section based on the data sets stored in the second storage section.

3. The memory system according to claim 2, wherein each of the data sets further includes attribute information of data written in the first storage section, and the storage controller performs control to store the data sets in each of the second storage sections.

4. The memory system according to claim 2, wherein the write latency to the second storage section is 100 ns or less.

5. The memory system according to claim 1, further comprising a first member on which the first storage section, the second storage section, and the storage controller are mounted,
   wherein the third storage section is provided in a second member separate from the first member.

6. The memory system according to claim 1, further comprising a nonvolatile fourth storage section that stores at least some of the data sets stored in the second storage section,
   wherein the storage controller is configured to perform control to store at least some of the data sets stored in the second storage section in the fourth storage section during a period from the execution of a write command to the execution of a next write command by the processor, and to permit overwriting of data sets stored in the fourth storage section among the data sets stored in the second storage section.

7. The memory system according to claim 6, further comprising: a first member on which the first storage section, the second storage section, the fourth storage section, and the storage controller are mounted,
   wherein the third storage section is provided in a second member separate from the first member.

8. The memory system according to claim 6, wherein the writing speed to the second storage section is higher than the writing speed to the fourth storage section, and
   wherein the fourth storage section has a smaller storage capacity than that of the third storage section and the fourth storage section has a larger storage capacity than that of the second storage section.

9. The memory system according to claim 6, wherein the storage controller is configured to write the data to be written back to the third storage section based on the data sets written in the fourth storage section.

10. The memory system according to claim 1, further comprising:
    a first member on which the first storage section is mounted; and
    a second member on which the second storage section, the fourth storage section, and the storage controller are mounted,
    wherein the third storage section is provided in a third member separate from the first member and the second member.

11. The memory system according to claim 1, wherein the writing speed to the second storage section is higher than the writing speed to the fourth storage section.

12. The memory system according to claim 1, wherein the storage controller is configured to write the data to be written back to the third storage section based on the data sets written in the fourth storage section.

13. The memory system according to claim 1, further comprising:
    a plurality of first members on each of which the first storage section is mounted; and
    a second member on which a plurality of the second storage sections each of which stores the data sets corresponding to the first storage section mounted on each of the plurality of first members, and the storage controller are mounted,
    wherein the third storage section is provided in a third member separate from the first members and the second member.

14. The memory system according to claim 1, wherein each of the data sets further includes attribute information of data to be written or already written in the first storage section, and the storage controller performs control to store the data sets in each of the second storage sections.

15. The memory system according to claim 1, wherein the write latency to the second storage section is 100 ns or less.

16. The memory system according to claim 1, wherein the second storage section is an MRAM (Magnetoresistive Random Access Memory).

17. The memory system according to claim 1, wherein a DIMM (Dual Inline Memory Module) on which the first storage section, the second storage section, and the storage controller are mounted is provided.

18. A processor system, comprising:
    a processor; and
    a memory system accessed by the processor;
    wherein the memory system includes:
    a volatile first storage section;
    a nonvolatile second storage section having a smaller storage capacity than that of the first storage section;
    a storage controller that performs control to store data sets in the second storage section, each of the data sets including data written in the first storage section in response to a write command from a processor, address information indicating a write destination in the first storage section, and address information indicating a write destination in a nonvolatile third storage section to which the data written in the first storage section is to be written back; and a nonvolatile fourth storage section that stores at least some of the data sets stored in the second storage section, wherein when the data in the first storage section is lost before the data in the first storage section is written back to the third storage section, the storage controller is configured to write back the data sets stored in the second storage section to the fourth storage section.

* * * * *